June 8, 1926.　　　　　　　　　　　　　　　　　　　　　1,588,298
G. W. BOOKSH, JR
DEHYDRATING PLANT
Filed Jan. 13, 1926　　　　3 Sheets-Sheet 1

Inventor
George W. Booksh, Jr.
by Wilkinson & Giusta
Attorneys.

June 8, 1926.  G. W. BOOKSH, JR  1,588,298

DEHYDRATING PLANT

Filed Jan. 13, 1926   3 Sheets-Sheet 2

Inventor
George W. Booksh, Jr.
by Wilkinson & Ginota
Attorneys.

June 8, 1926.

G. W. BOOKSH, JR 1,588,298

DEHYDRATING PLANT

Filed Jan. 13, 1926    3 Sheets-Sheet 3

Inventor
George W. Booksh, Jr.
by Wilkinson & Giusta
Attorneys.

Patented June 8, 1926.

1,588,298

UNITED STATES PATENT OFFICE.

GEORGE W. BOOKSH, JR., OF SHERBURNE, LOUISIANA.

DEHYDRATING PLANT.

Application filed January 13, 1926. Serial No. 81,047.

The present invention relates to improvements in dehydrating plants and has for an object to provide a dry kiln in which, by an improved arrangement, a more effective circulation of hot air may be secured to and through the material to be dried.

Another object of the invention is to provide an improved reversible tray structure in which the material may be conveniently placed and removed and in further so designing, arranging and constructing the drying chamber as to conveniently receive this tray and permit its ready removal therefrom.

A further object of the invention lies in producing a compact and inexpensive installation in which a rather lengthy circulation of hot air may be had, however, and in which the distribution of the hot air may be controlled and confined to desired parts of the apparatus through the use of external controls.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of an improved dehydrating plant constructed according to the present invention.

Referring more particularly to the drawings 9 designates the bottom, 10 the front wall, 11 the rear wall and 12 and 13 the side walls of the external casing of the plant. This casing is covered by the roof 14, which slopes from the side walls 12 and 13 up to a central ridge to which the hot air outlet pipe 15 is connected.

Figure 2:
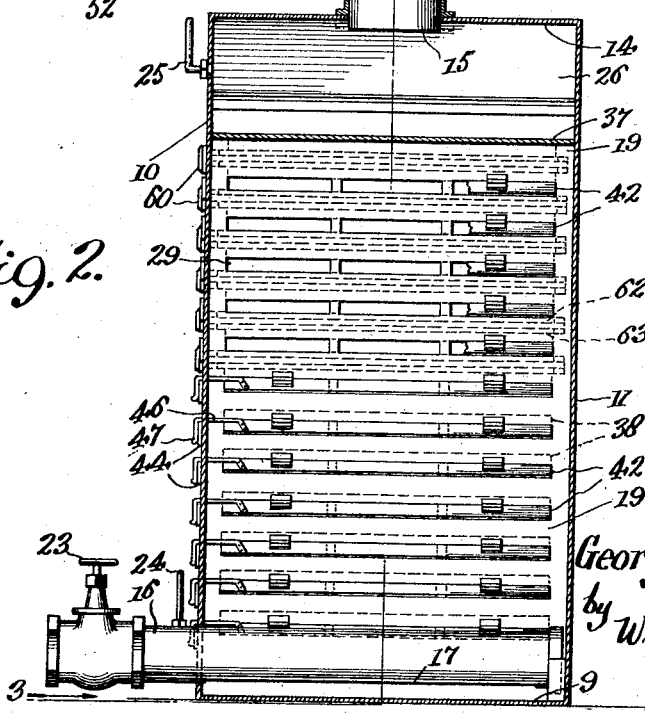
Figure 2 is a vertical section taken therethrough on the line 2—2 in Fig. 1.
Figure 3:
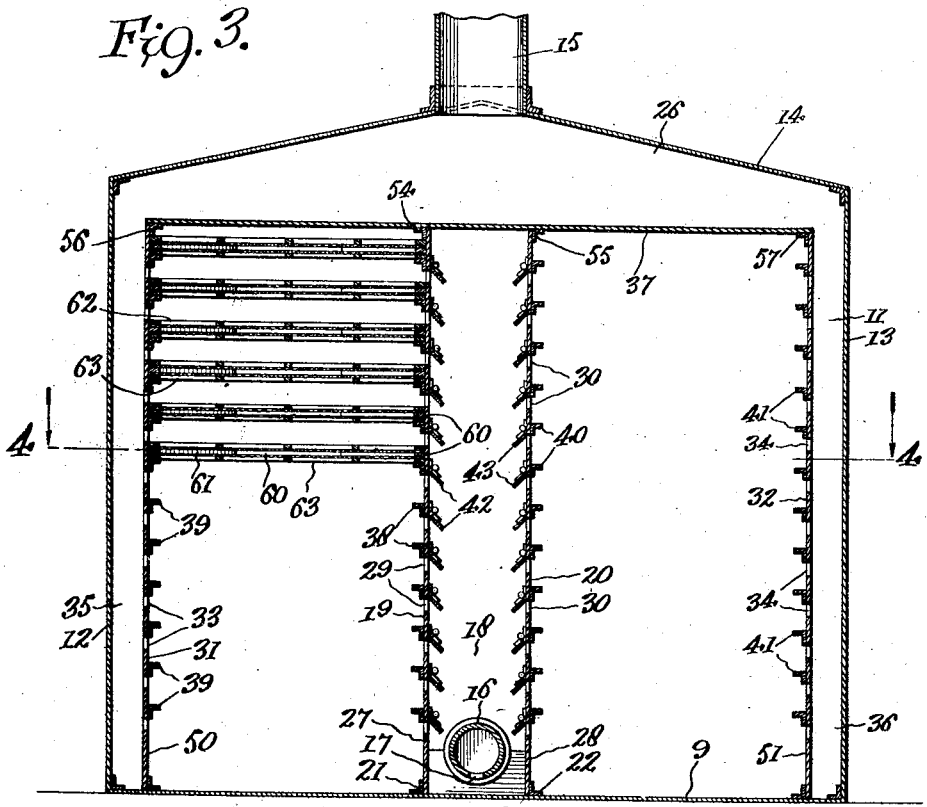
Figure 3 is a vertical central section taken at right angles to Figure 2 taken on the line 3—3 in Fig. 2.

The hot air inlet pipe 16 extends through the front wall 10 at the lower central part thereof and is provided in its lower side near the central part of the bottom 9 with the elongated slot 17 provided to liberate the hot air into the central vertical distributing space 18 confined between the walls 19 and 20 which extend down to the bottom 9 at opposite sides of the pipe 16 and spaced therefrom. These walls 19 and 20 may be secured to the bottom in any appropriate way as by the use of the angle strips 21 and 22. The pipe 16, as shown in Figure 2, is provided with the regulating valve 23 externally of the casing to admit of its manual regulation. The pipe 16 extends to the apparatus shown in Figure 8, to which reference will later be had.

A thermometer 24 is disposed upon the heating pipe 16 just outside the casing and a second thermometer 25 is also preferably placed upon the exterior of the casing and at the upper portion thereof in the space 26 confined by the sloping roof 14.

Figure 5:
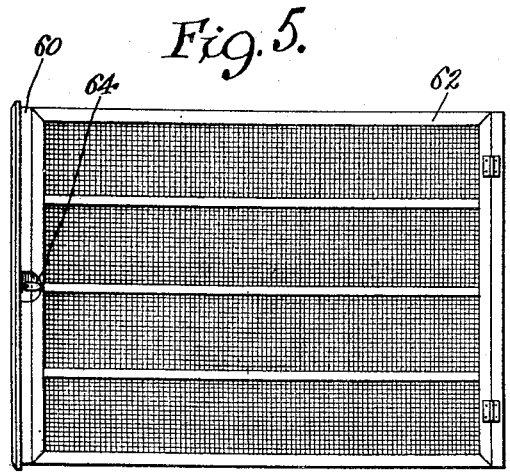
Figure 5 is a plan view of one of the improved trays.
Figure 6:
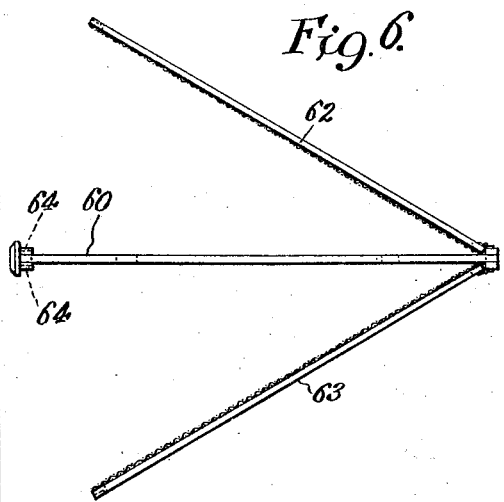
Figure 6 is an edge view thereof with the doors of the tray open.
Figure 7:
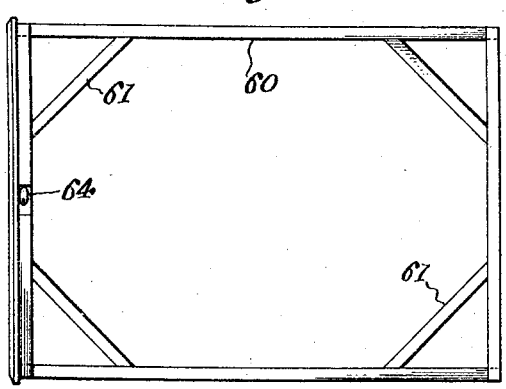
Figure 7 is a plan view of the tray frame.

The walls 19 and 20, as before stated, are erected substantially vertically upon the base 9 and they extend from the front wall 10 to the rear wall 11, whereby the heated air issuing through the slot 17 in the pipe 16, and being deflected upwardly to opposite sides of the pipe 16 by the bottom 9 and by the imperforate lower portions 27 and 28 of the walls or partitions 19 and 20, will be compelled to travel upwardly in the central space confined by the walls 19 and 20. From this central space 18 the hot air is distributed through slots 29 and 30 made in the walls 19 and 20. These slots 29 and 30, as shown in Figure 2, are preferably not continuous horizontally, but three disconnected slots are shown in horizontal alinement opposite each of the tray compartments in order that portions of the metal wall may lie between the slots and avoid the undue weakening of the walls. The trays, which are more particularly illustrated in Figures 5, 6 and 7 are supported between the walls 19 and 20 and outer walls 31 and 32. These outer walls resemble the walls 19 and 20, are vertically disposed, rest on the bottom 9, extend from the front wall 10 to the back wall 11, are of approximately the same height as the walls 19 and 20 are provided with the slots 33 and 34. The walls 31 and 32 are set inwardly of the side walls 12 and 13 and are substantially parallel with said walls 12 and 13 to provide the flues 35 and 36 which communicate with the space 26 above the imperforate top 37 of the two drying chambers. One of the drying chambers is located between the walls 19 and 31 and a number of trays may be removably placed in this chamber; while a second similar drying chamber is comprised between the walls 20 and 32. The trays in the one chamber are held upon the angle iron strips 38 and 39 secured to the walls 19 and 31 respectively. Similar angle strips 40 and 41 are placed upon the walls 20 and 32 to slidably receive the trays in the second drying chamber.

The slots in the walls are preferably spaced immediately below the respective angle strips and above the angle strip blank portions of the wall are left to receive the sides of the trays. The interior distributing space 18 is wider and of greater cubical contents than either of the flues 35 or 36 or the combined cubical contents of both flues.

Various slots 29 and 30 in the walls 19 and 20 are designed to be masked or opened by the dampers 42 and 43 hinged to the inner faces of the walls 19 and 20 opposite the angle irons 38 and 40. These dampers hinge downwardly and when open they project at an acute angle outwardly from the walls whereby to catch the ascending heated air and divert it through the controlled slot to the tray or compartment which this particular damper guards.

Figure 1:
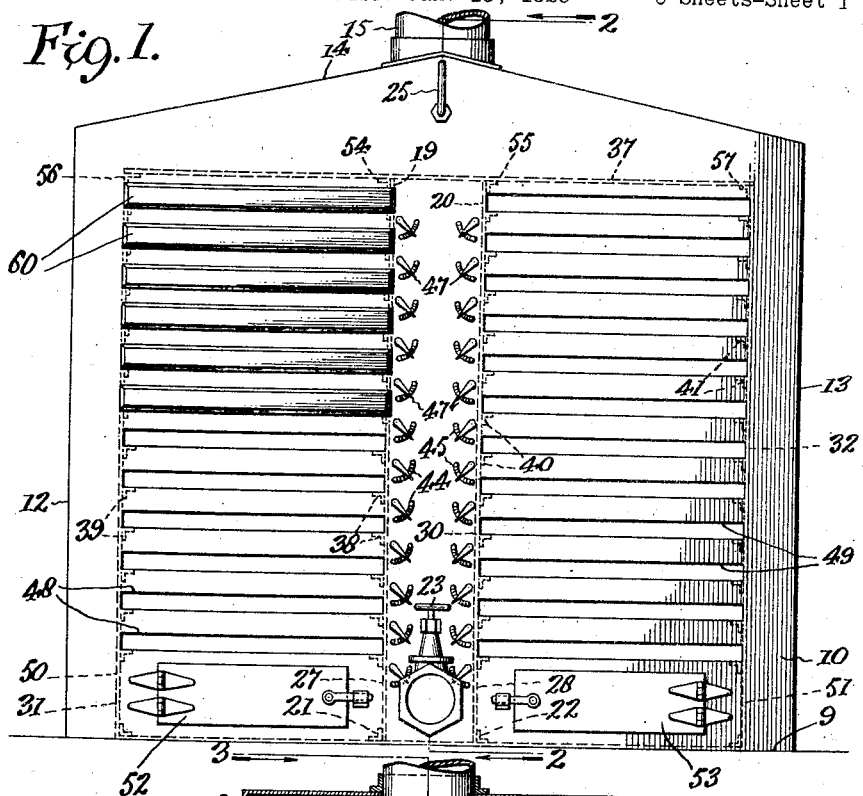

As shown in Figure 1 the front wall 10 is provided with arcuate slots 44 and 45 opposite the dampers to receive the rods 46 which project from the dampers and are provided with the crank arms 47, shown in Figures 1 and 2. By an angular movement of these crank arms the dampers may be opened or closed as desired and held in the open or closed position by the friction of their hinges or in any other appropriate manner.

Figure 4:
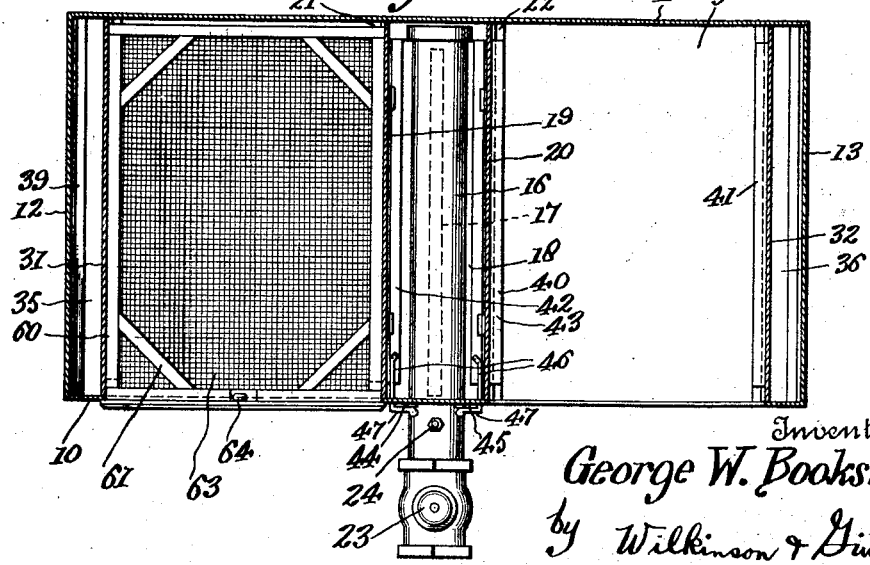
Figure 4 is a horizontal section taken on the line 4—4 in Figure 3.

As shown in Figures 1 and 4 the front wall is provided with slots 48 and 49 through which the trays may be slipped horizontally and these slots are in alinement with the various angle iron shelves for receiving the trays. The lowermost tray will be supported at a considerable distance above the bottom 9 of the casing and above the imperforate portions 27 and 28 of the walls 19 and 20. Similar imperforate portions 50 and 51 are provided at the lower parts of the outer chamber walls 31 and 32. In Figure 1 are shown doors 52 and 53 in the front wall and at the lower part for giving access to the bottom portions of the drying chambers. The chambers may be cleaned through these doors.

The top 37 of the drying chambers extends in common over both said drying chambers and also over the central distributing chamber 18. The walls 19 and 20 are secured to the top 37 as by the angle irons 54 and 55; while the outer chamber walls 31 and 32 are also secured to the outer edges of the imperforate top 37 as by the angle irons 56 and 57.

Referring to Figures 5, 6 and 7 the improved tray consists of a substantially rectangular frame 60 having the cross braces 61 and the double doors 62 and 63, shown in Figure 6 as being hinged at opposite sides of the frame. Latches 64, as shown in Figure 5 may be used to secure the doors to the frame at their free ends. The trays are reversible by virtue of the duplex doors and either door may be secured in place and act as a base upon which the material to be dried is placed. Thereafter the other door is closed and secured and the tray is in readiness to be slid into one of the drying chambers.

Figure 8:
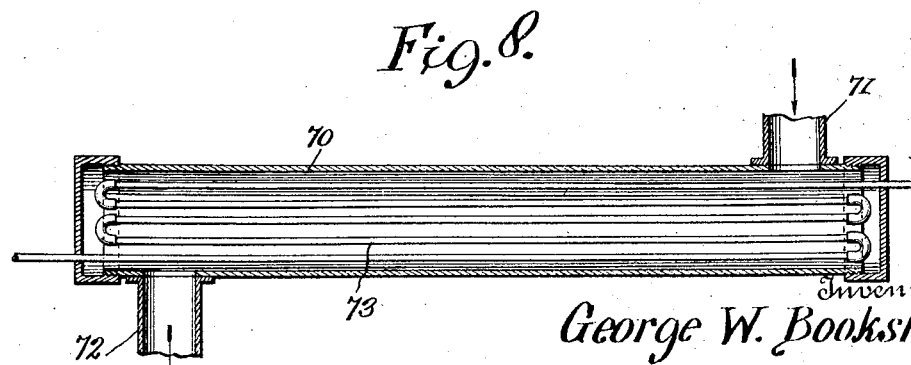
Figure 8 is a longitudinal section taken through the apparatus for initially heating the air prior to its delivery to the dehydrating plant.

In Figure 8, 70 indicates a pipe or casing having a connection 71 at one end for receiving cold air and a connection 72 at its other end for conveying the hot air generated in the chamber 70 to the hot air pipe 16 of the dehydrating plant. In the generator casing 70 is a steam coil 73 in circuit with a boiler or other appropriate source of steam. The circulation of steam through the coil 73 will heat the air circulating through the generator casing 70.

In use, the heated air is generated in the apparatus shown in Figure 8 and circulated to the pipe 16. This heated air is introduced into the distributing space 18 under the control of the valve 23 in the pipe 16. The heated air issuing downwardly through the slot 17 will be caused to quietly and uniformly ascend and fill the distributing space 18, but this heated air will not be permitted to escape by reason of the imperforate top 37 until it passes laterally and horizontally through such of the trays or tray compartments as are open through the dampers 42 and 43. After passing through the trays and the material in the trays the air may escape through the slots in the outer drying chamber walls and escape into the flues 35 and 36. By reason of the narrow character of these flues there will be a backing-up of the pressure which will cause the heated air to remain in the drying chamber for an extended period thus utilizing to the fullest this heated air and eliminating as far as possible the waste thereof. The heated air in ascending the flues 35 and 36 will strike the sloping walls of the roof 14 and be diverted to the pipe 15 and also by rebounding from the roof 14 the heated air will be brought against the upper surface of the imperforate top 37 and this will also act to keep the drying chambers heated and prevent the rapid conduction of the heat all through the top of the plant. The screen doors 62 and 63 of the tray permit the passage of the heated products upwardly therethrough and contribute to the effective drying of great quantities of products in a very short space of time.

It is obvious that various changes and modifications may be made in the details of construction and design of the above specifically described embodiment of this invention without departing from the spirit thereof, such changes and modifications being restricted only by the scope of the following claims.

What is claimed is:—

1. A dehydrating plant comprising an external casing having an outlet at its upper portion, an internal structure within said casing providing a central hot air distributing space and lateral drying chambers beside said space, said structure being spaced from the sides of said drying chambers to provide flues in communication with the drying chambers and with the upper portion of the external casing, a roof over said drying chambers and central space, and means to control the passage of the hot air from said distributing space to and through the drying chambers.

2. A dehydrating plant comprising an external casing having an outlet for the hot air at its upper portion, means for introducing hot air to the lower central portion of the casing, an internal structure within said casing having inner spaced walls forming a distributing space and outer spaced walls forming with the first named walls drying chambers, said last named walls being spaced from the sides of the external casing to provide narrow flues leading upwardly into the upper portion of said external casing, both sets of said walls having openings therein to permit the passage laterally of the hot air, a top extending in common over said drying chambers and the distributing space, and means in the distributing space for controlling the access of the hot air to the drying chambers and for intercepting and diverting the hot air thereto.

3. A dehydrating plant comprising an external casing having an outlet for the hot air at its upper portion, means for introducing hot air to the lower central portion of the casing, an internal structure within said casing having inner spaced walls forming a distributing space and outer spaced walls forming with the first named walls drying chambers, said last named walls being spaced from the sides of the external casing to provide narrow flues leading upwardly into the upper portion of said external casing, both sets of said walls having openings therein to permit the passage laterally of the hot air, a top extending in common over said drying chambers and the distributing space, and means in the distributing space for controlling the access of the hot air to the drying chambers and for intercepting and diverting the hot air thereto, shelves in the drying chambers opening through the external casing, and foraminous trays removably mounted on said shelves for containing the material to be dried.

4. A dehydrating plant comprising an external casing having an outlet at its upper portion for the hot air, means at the lower central portion of the casing for introducing hot air, spaced slotted walls in said external casing at opposite sides of said means for enclosing a hot air distributing space, a second set of slotted walls in said external casing spaced from the first set of walls and from the sides of said external casing to provide with the first set of walls drying chambers and flues outwardly of the drying chambers communicating with the upper portion of the external casing, shelves carried by said walls in the drying chambers, foraminous trays slidably mounted on said shelves, and externally controlled dampers mounted on the first set of walls for controlling the slots therein.

5. A dehydrating plant comprising an external casing having a sloping roof with a higher outlet at the upper portion thereof, a pair of spaced walls of lesser height than the casing mounted in spaced relation at the central portion thereof and extending from front to back of the casing, said walls being provided with slots, a second pair of walls spaced from the first set of walls and from the side walls of the casing being slotted and extending from front to back of the casing, said second set of walls provided with the first set of walls drying chambers and with the side walls of the external casing flues in communication with the upper part of the external casing, an imperforate top extending in common over the central space between the first pair of walls and over said drying chambers, shelves secured to the walls in the drying chambers just above said slots, foraminous trays slidably mounted on said shelves, dampers hinged to the first pair of walls just above the slots and adapted to open with their free ends extending downwardly at an acute angle to intercept the rising hot air, and means for externally adjusting said dampers.

6. A dehydrating plant comprising an external casing having a bottom, sides, slotted front wall, rear wall and roof sloping upwardly to a central ridge, an outlet at the ridge, an inner structure within said casing comprising double pairs of spaced walls having blank lower portions and slotted upper portions, the inner walls confining therebetween a hot air distributing space, a pipe extending longitudinally through said space with a slot along its lower side, a source of heated air in communication with said pipe, said outer walls forming with the inner walls drying chambers and with the side walls of the external casing flues, trays slidably mounted in said drying chamber, and dampers for controlling the flow of hot air from the distributing space to said drying chambers.

GEO. W. BOOKSH, Jr.